US012166942B2

(12) United States Patent
Ehara

(10) Patent No.: US 12,166,942 B2
(45) Date of Patent: Dec. 10, 2024

(54) INFORMATION PROCESSING APPARATUS, METHOD, AND STORAGE MEDIUM STORING PROGRAM

(71) Applicant: CANON KABUSHIKI KAISHA, Tokyo (JP)

(72) Inventor: Jun Ehara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 18/075,565

(22) Filed: Dec. 6, 2022

(65) Prior Publication Data

US 2023/0188660 A1    Jun. 15, 2023

(30) Foreign Application Priority Data

Dec. 14, 2021    (JP) ................................ 2021-202770

(51) Int. Cl.
*H04N 1/00*    (2006.01)
*G06F 3/12*    (2006.01)
*G06K 15/02*    (2006.01)
*H04N 1/32*    (2006.01)

(52) U.S. Cl.
CPC ..... *H04N 1/32635* (2013.01); *H04N 1/00464* (2013.01); *H04N 1/00891* (2013.01); *H04N 1/32641* (2013.01); *H04N 1/32662* (2013.01); *H04N 1/32694* (2013.01)

(58) Field of Classification Search
None
See application file for complete search history.

(56) References Cited

U.S. PATENT DOCUMENTS

2005/0018235 A1\*    1/2005    Shikata ................. G06F 3/1284
358/1.14

FOREIGN PATENT DOCUMENTS

| JP | 2005-222423 A | | 8/2005 | |
| JP | 2007219582 | \* | 8/2007 | ............. G06F 1/26 |
| JP | 2008146474 | \* | 6/2008 | ............. G06F 11/34 |
| JP | 2010239572 | \* | 10/2010 | ............. H04W 24/00 |
| JP | 2012206478 | \* | 10/2012 | ............. B41J 29/38 |
| JP | 2012213964 | \* | 11/2012 | ............. G06F 3/12 |
| JP | 2015003451 | \* | 1/2015 | ............. G06F 3/12 |
| JP | 2021129745 | \* | 9/2021 | ............. Y02E 60/10 |

\* cited by examiner

*Primary Examiner* — Beniyam Menberu
(74) *Attorney, Agent, or Firm* — VENABLE LLP

(57) ABSTRACT

If an operation of canceling a predetermined state includes an operation of powering off the device, even if communication between the device and the information processing apparatus becomes inexecutable after the screen for cancelling the predetermined state is displayed, the information processing apparatus does not execute a notification corresponding to a state in which the communication is inexecutable. If the operation of canceling the predetermined state does not include the operation of powering off the device, the information processing apparatus executes, based on a fact that the communication between the device and the information processing apparatus becomes inexecutable after the screen for cancelling the predetermined state is displayed, the notification corresponding to the state in which the communication is inexecutable.

20 Claims, 11 Drawing Sheets

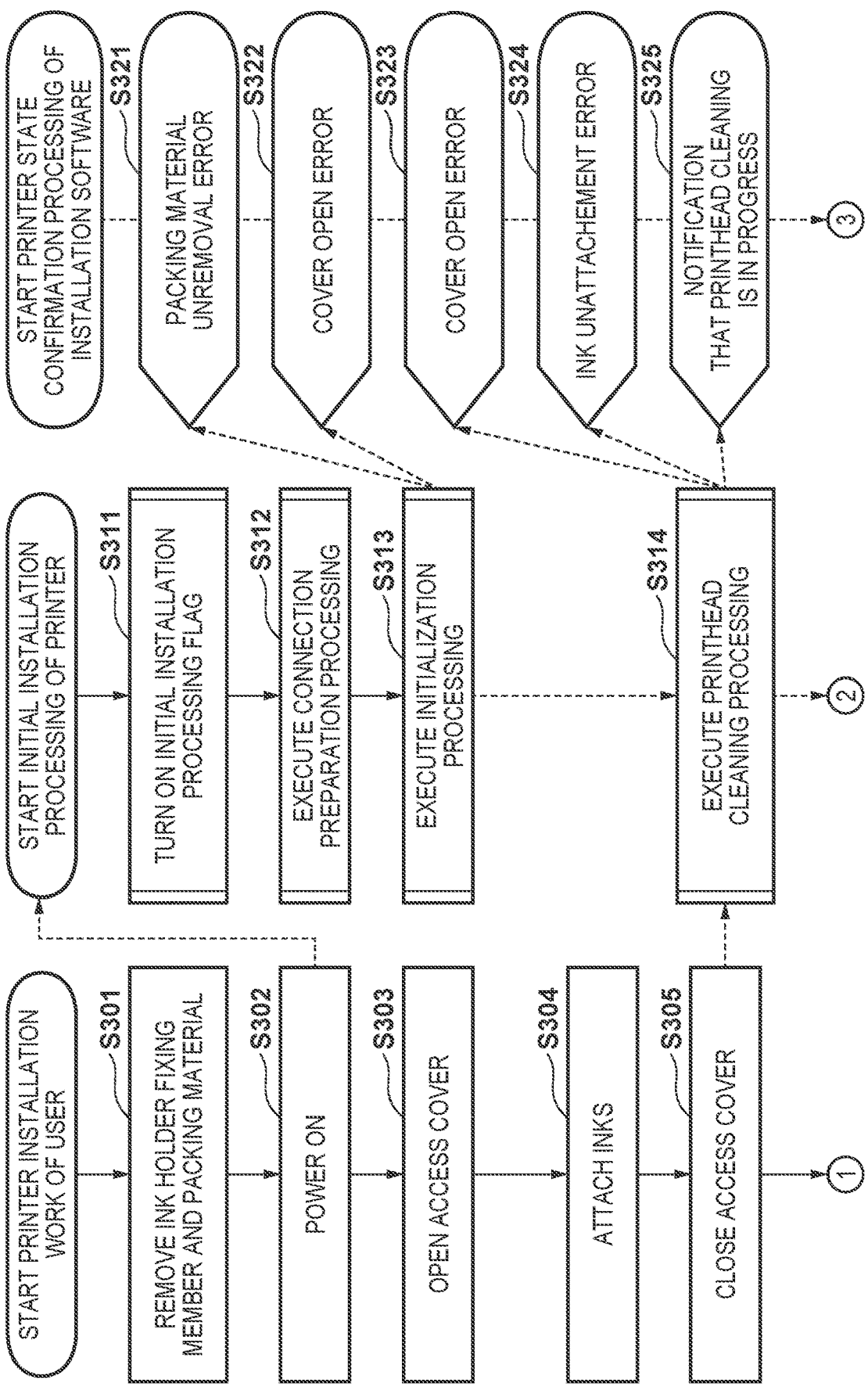

CONNECT TO PRINTER
SET PRINTER BELOW TO BE USABLE FROM THIS PC.
XXXX printer

501 — NEXT

PAPER JAM

SUPPORT NUMBER: 13xx
PULL PAPER TO REMOVE IT FROM PRINTER.

UPON PAPER JAM IN PRINTER, FIRST POWER OFF PRINTER.
THEREAFTER, THIS SOFTWARE WILL CONTINUE TO GUIDE YOU IN HANDLING JAM.

WAITING FOR PRINTER TO BE POWERED OFF
PLEASE WAIT...

PLEASE PULL OUT PAPER

OPEN ACCESS COVER.
NEXT, HOLD SHEET FIRMLY WITH BOTH HANDS AND PULL IT OUT SLOWLY SO NOT TO TEAR THE PAPER.

531

NEXT

540 — RE-SET PAPER SHEET

CLOSE ACCESS COVER.
NEXT, RE-SET PAPER SHEET AND POWER ON PRINTER AGAIN.

550 — CANNOT CONFIRM PRINTER STATE

PREPARE PRINTER MAIN BODY WITH REFERENCE TO MANUAL.
CLICK [MANUAL] AND RE-CONNECT ACCORDING TO GUIDE.

551 — MANUAL

560 — INSTALLING PRINTER DRIVER
PLEASE WAIT.

561
65%

530 — SETUP IS COMPLETED
PRINTER INSTALLATION WORK IS COMPLETED.

571 — TEST PRINT
572 — END

INFORMATION PROCESSING APPARATUS, METHOD, AND STORAGE MEDIUM STORING PROGRAM

BACKGROUND OF THE INVENTION

Field of the Invention

The present invention relates to an information processing apparatus, a method, and a storage medium storing a program.

Description of the Related Art

When installing (initially installing) a device for the first time, or when using a device after initial installation, if a necessary operation according to the device is in shortage, or an error occurs in the device, the user may be unable to use the device. For example, if the device is a printing apparatus (printer), it may be impossible to perform printing. If the device does not include a display device of a sufficient size, and a work procedure cannot sufficiently be shown on the display device, in some cases, an information processing apparatus such as a PC including a display device of a sufficient size is connected to the device, and a work procedure according to the state of the device is displayed on the information processing apparatus.

For some errors that occur in a device, to cancel the errors, the user needs to power off the device. For example, if a paper jam error occurs in the printer when print execution is instructed from installation software or a printer driver operating on a PC to a printer that is the device, the user sometimes powers off and on the printer to cancel the error. Japanese Patent Laid-Open No. 2005-222423 describes an information processing apparatus that performs predetermined processing for a print job after recognizing that processing associated with power-off is executed in the printer.

SUMMARY OF THE INVENTION

The present invention provides to execute appropriate control in an information processing apparatus if an error occurs in a device.

The present invention in one aspect provides a method comprising: acquiring, from an external device comprising a printing unit, device information concerning the device; if information corresponding to a fact that the external device is in a predetermined state in which processing using the printing unit is inexecutable is included in the acquired device information, displaying, on a display unit of an information processing apparatus, a screen for cancelling the predetermined state; and in a case where an operation of canceling the predetermined state includes an operation of powering off the device, even if communication between the device and the information processing apparatus becomes inexecutable after the screen for cancelling the predetermined state is displayed, not executing a notification corresponding to a state in which the communication between the device and the information processing apparatus is inexecutable, and in a case where the operation of canceling the predetermined state does not include the operation of powering off the device, and executing, based on a fact that the communication between the device and the information processing apparatus becomes inexecutable after the screen for cancelling the predetermined state is displayed, the notification corresponding to the state in which the communication between the device and the information processing apparatus is inexecutable.

According to the present invention, if an error occurs in a device, appropriate control can be executed in an information processing apparatus.

Further features of the present invention will become apparent from the following description of exemplary embodiments with reference to the attached drawings.

BRIEF DESCRIPTION OF THE DRAWINGS

FIGS. 3A and 3B are sequence charts of linked setup processing;
FIGS. 5A to 5H are views showing screens displayed by the setup application.

DESCRIPTION OF THE EMBODIMENTS

Figure 1:
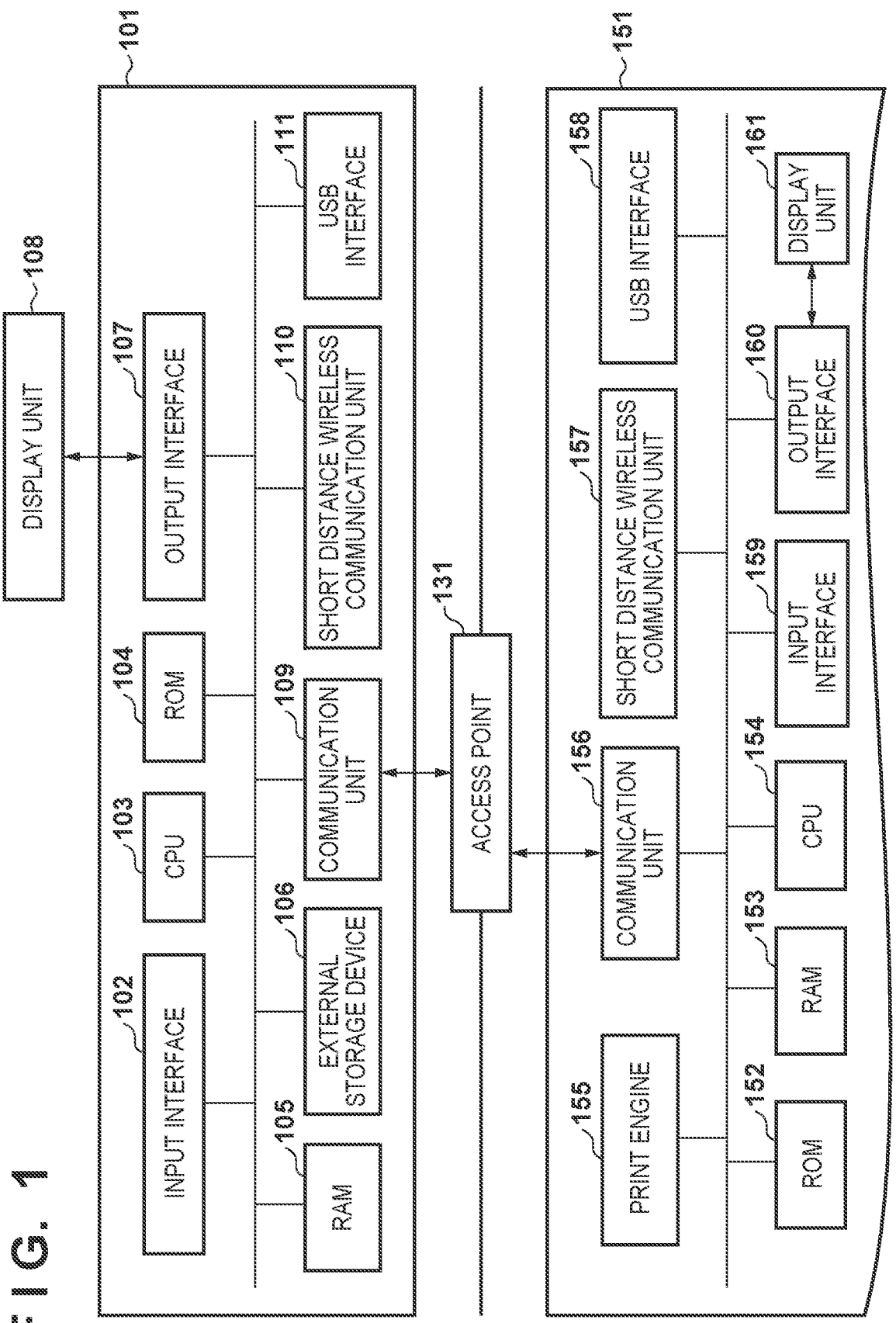
FIG. 1 is a view showing the configuration of a system.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

If a user performs a power-off operation to cancel (resolve) an error that occurs in a device, the device and an information processing apparatus are disconnected. At this time, it may be impossible to execute appropriate control in the information processing apparatus.

According to the present disclosure, if an error occurs in the device, appropriate control can be executed in the information processing apparatus.

First Embodiment

FIG. 1 shows an example of the configuration of a system including an information processing apparatus 101, and a printing apparatus 151 capable of communicating with the information processing apparatus 101. As the information processing apparatus 101 included in the system according to this embodiment, for example, a PC or a smartphone serving as a portable terminal is used. However, the functions are not limited to those shown in FIG. 1 if the apparatus is applicable concerning an apparatus capable of communicating with the printing apparatus 151. In addition, for example, a printer is used as the printing apparatus 151. However, the apparatus is not limited to a printer, and various apparatuses can be applied if the apparatuses are applicable concerning an apparatus capable of communicating with the information processing apparatus 101. For example, concerning a printer, the apparatus can be applied to an inkjet printer, a full-color laser beam printer, a monochrome printer, and the like. The apparatus can be applied not only to a printer but also to a copying machine, a facsimile apparatus, a portable terminal, a smartphone, a laptop, a tablet terminal, a PDA (Personal Digital Assistant), a digital camera, a music playback device, a television, and the like. The apparatus can also be applied to a multi-function peripheral having a plurality of functions such as a copying function, a FAX function, and a print function.

The information processing apparatus 101 includes an input interface 102, a CPU 103, a ROM 104, a RAM 105, an external storage device 106, an output interface 107, a display unit 108, a communication unit 109, a short distance wireless communication unit 110, and a USB interface 111. The input interface 102 is an interface configured to accept data input and operation instructions from the user, and is formed by a physical keyboard, buttons, a touch panel, and the like. Note that the output interface 107 to be described later and the input interface 102 may have the same configuration, and output of a screen and acceptance of an operation from the user may be done by the same configuration.

The CPU 103 is a system control unit and comprehensively controls the whole information processing apparatus 101. The ROM 104 is a storage unit that stores permanent data such as control programs to be executed by the CPU 103, data tables, and an embedded operating system (to be referred to as an OS hereinafter) program. In this embodiment, the control programs stored in the ROM 104 perform software execution control such as scheduling, task switch, and interrupt processing under the management of the embedded OS stored in the ROM 104.

The RAM 105 is a storage unit that is formed by an SRAM (Static Random Access Memory) or the like, which needs a backup power supply. Note that the RAM 105 can store important data such as program control variables without volatilization because the data are held by a primary battery (not shown) for data backup. In addition, a memory area for storing setting information of the information processing apparatus 101, management data of the information processing apparatus 101, and the like is also provided in the RAM 105. Also, the RAM 105 is sometimes used as the main memory and the work memory of the CPU 103.

The external storage device 106 is a storage unit that stores a setup application program (setup application) configured to perform setup processing of the printing apparatus 151, an application program (application) that provides a print execution function, and the like. Also, the external storage device 106 is a storage unit that stores a print information generation program that generates print information interpretable by the printing apparatus 151, and the like. These applications and programs are sometimes downloaded from an external server (not shown) different from the printing apparatus 151 and stored. Also, the external storage device 106 stores various kinds of programs such as an information transmission/reception control program to be transmitted/received to/from the printing apparatus 151 connected via the communication unit 109, and various kinds of information to be used by the programs.

The output interface 107 is an interface configured to perform control for causing the display unit 108 to display data or notify the user of the state of the information processing apparatus 101. The display unit 108 is formed by an LED (Light-Emitting Diode), an LCD (Liquid Crystal Display), or the like and displays data or makes a notification concerning the state of the information processing apparatus 101. Note that a virtual keyboard including keys such as a numerical value input key, a mode setting key, an enter key, a cancel key, and a power key may be installed on the display unit 108 to accept an input from the user via the display unit 108. In this case, the display unit 108 plays the role of the input interface 102.

The communication unit 109 is a component connected to the printing apparatus 151 to execute data communication. For example, the communication unit 109 can be connected to an access point (not shown) in the printing apparatus 151. When the communication unit 109 and the access point in the printing apparatus 151 are connected, the information processing apparatus 101 and the printing apparatus 151 can communicate with each other. Note that between the information processing apparatus 101 and the printing apparatus 151, the communication unit 109 may directly communicate with the printing apparatus 151 by wireless communication. The communication unit 109 may also perform communication via an external access point (access point 131) existing outside the information processing apparatus 101 or the printing apparatus 151. As a wireless communication method, for example, Wi-Fi (Wireless Fidelity)® or Bluetooth®, which is a communication standard based on the IEEE802.11 series is used. In addition, for example, a device such as a wireless LAN router is used as the access point 131. Note that the method of directly connecting the information processing apparatus 101 and the printing apparatus 151 without the intermediary of an external access point is called a direct connection method. In addition, the method of connecting the information processing apparatus 101 and the printing apparatus 151 via the external access point 131 is called an infrastructure connection method.

The short distance wireless communication unit 110 is a component wirelessly connected to the printing apparatus 151 at a short distance to execute data communication, and performs communication by a communication method different from the communication unit 109. The short distance wireless communication unit 110 can be connected to a short distance wireless communication unit 157 in the printing apparatus 151. Note that in this embodiment, as the communication method of the short distance wireless communication unit 110, Bluetooth5.1 is used. Note that Bluetooth5.1 includes both Classic Bluetooth and Bluetooth Low Energy (BLE). For example, either Classic Bluetooth or BLE can be used as the communication method of the short distance wireless communication unit 110. The USB interface 111 is a component configured to execute data communication via, for example, a USB cable.

The printing apparatus 151 includes a ROM 152, a RAM 153, a CPU 154, a print engine 155, a communication unit 156, the short distance wireless communication unit 157, a USB interface 158, an input interface 159, an output interface 160, and a display unit 161.

The communication unit 156 includes, as an access point in the printing apparatus 151, an access point configured to connect the information processing apparatus 101. Note that the access point can be connected to the communication unit 109 of the information processing apparatus 101. Note that the communication unit 156 may communicate with the information processing apparatus 101 directly by wireless communication without the intermediary of the access point 131, or may communicate via the access point 131. As the communication method, for example, Wi-Fi (Wireless Fidelity)® or Bluetooth® is used. Note that in the direct communication, the Wi-Fi Direct standard may be used, or the Legacy Wi-Fi standard may be used. Also, the communication unit 156 may include hardware functioning as an access point, or may be operated as an access point by software configured to cause the unit as an access point.

The short distance wireless communication unit 157 is a component configured to wirelessly connect to the information processing apparatus 101 at a short distance. In this embodiment, Bluetooth5.1 is used as the communication method of the short distance wireless communication unit 157. For example, in this embodiment, BLE may be used as the communication method of the short distance wireless communication unit 157. The USB interface 158 is a component configured to execute data communication via, for example, a USB cable.

The RAM 153 is formed by an SRAM or the like, which needs a backup power supply. Note that the RAM 153 can store important data such as program control variables without volatilization because the data are held by a primary battery (not shown) for data backup. In addition, a memory area for storing setting information of the printing apparatus 151, management data of the printing apparatus 151, and the like is also provided in the RAM 153. Also, the RAM 153 is used as the main memory and the work memory of the CPU 154, and functions as a reception buffer configured to temporarily store print information received from the information processing apparatus 101 or the like, or stores various kinds of information. The ROM 152 stores permanent data such as control programs to be executed by the CPU 154, data tables, and an OS program. In this embodiment, the control programs stored in the ROM 152 perform software execution control such as scheduling, task switch, and interrupt processing under the management of the embedded OS stored in the ROM 152.

The CPU 154 is a system control unit and comprehensively controls the whole printing apparatus 151. Based on information stored in the RAM 153 or a print job received from the information processing apparatus 101 or the like, the print engine 155 forms an image on a print medium such as a paper sheet using printing material such as ink and outputs the print result. At this time, since the print job transmitted from the information processing apparatus 101 or the like has a large transmission data amount, and high-speed communication is required, the print job is received via the communication unit 156 capable of performing communication at a speed higher than the short distance wireless communication unit 157.

Note that a memory such as an external HDD or an SD card may be attached as an optional device to the printing apparatus 151, and information stored in the printing apparatus 151 may be stored in the memory. Also, a connection mode is set for the printing apparatus 151 by connection setting processing, and the printing apparatus 151 communicates with the information processing apparatus 101 by a connection form based on the set connection mode. In the printing apparatus 151, to perform communication by infrastructure connection (connection via the access point 131), an infrastructure connection mode is set as the connection mode. To perform communication by direct connection (connection without the intermediary of the access point 131), a direct connection mode is set as the connection mode. Note that in this embodiment, the setup application can execute, as setup processing, setting of the network environment of the printing apparatus 151. Here, the setting of the network environment is, for example, setting of the wireless network of the printing apparatus 151, and is setting for causing the printing apparatus 151 to establish connection via an access point described with reference to FIG. 1 or connection via a USB cable. In this embodiment, if the printing apparatus 151 is powered on without completing the main body installation operation, the printing apparatus 151 starts the operation in a state called a setup mode. The setup mode is processing of enabling an access point in the printing apparatus 151, which is enabled only in the setup mode. By the setup application, the information processing apparatus 101 searches for the printing apparatus 151 operating in the setup mode, and is directly Wi-Fi-connected to the printing apparatus 151 via the access point enabled by the found printing apparatus 151. By the setup application, the information processing apparatus 101 then transmits, via the Wi-Fi connection, setting information used to set the network environment of the printing apparatus 151. More specifically, the setting information is, for example, information used to connect the access point 131 or information used to cause the printing apparatus 151 to operate in the direct connection mode. If the information used to connect the access point 131 is transmitted as the setting information, the printing apparatus 151 is Wi-Fi-connected to the access point 131 and operates in the infrastructure connection mode. Note that at this time, for example, the access point 131 is an access point connected to the information processing apparatus 101 before the information processing apparatus 101 is connected to the printing apparatus 151 operating in the setup mode. After transmitting the setting information to the printing apparatus 151, the information processing apparatus 101 is Wi-Fi-connected to the access point 131 again. Accordingly, infrastructure connection is established between the information processing apparatus 101 and the printing apparatus 151. On the other hand, if the information used to cause the printing apparatus 151 to operate in the direct connection mode is transmitted as the setting information, by the setup application, the information processing apparatus 101 receives, from the printing apparatus 151, connection information used to directly connect the printing apparatus 151. The printing apparatus 151 then starts operating in the direct connection mode. By the setup application, the information processing apparatus 101 is Wi-Fi-connected to the printing apparatus 151 using the connection information. Accordingly, direct connection is established between the information processing apparatus 101 and the printing apparatus 151. Note that a form in which communication between the information processing apparatus 101 and the printing apparatus 151 operating in the setup mode is executed by Wi-Fi has been described. However, the present invention is not limited to this form. Communication between the information processing apparatus 101 and the printing apparatus 151 operating in the setup mode may be executed by connection by a communication method other than Wi-Fi. The communication method other than Wi-Fi is, for example, Bluetooth (Classic Bluetooth or Bluetooth Low Energy).

The input interface 159 is an interface configured to accept data input and operation instructions from the user, and is formed by a physical keyboard, buttons, a touch panel, and the like. Note that the output interface 160 and the input interface 159 may have the same configuration, and output of a screen and acceptance of an operation from the user may be done by the same configuration. The output interface 160 is an interface configured to perform control for causing the display unit 161 to display data or notify the user of the state of the printing apparatus 151. The display unit 161 is formed by a panel or the like and displays data or makes a notification concerning the state of the printing apparatus 151. Note that a virtual keyboard including keys such as a numerical value input key, a mode setting key, an enter key, a cancel key, and a power key may be installed on the display unit 161 to accept an input from the user via the display unit 161. In this case, the display unit 161 plays the role of the input interface 159.

A communication method other than the above-described communication method may be used between the information processing apparatus 101 and the printing apparatus 151. For example, a communication method such as Ethernet, Centronics, or IrDA (Infrared Data Association) may be used. Also, FIG. 1 shows connection between one information processing apparatus 101 and one printing apparatus 151. However, by using the communication interface configuration of each apparatus or a network device such as a USB hub, the information processing apparatus 101 may be connected to a plurality of printing apparatuses 151, or the printing apparatus 151 may be connected to a plurality of information processing apparatuses 101.

Figure 2A:
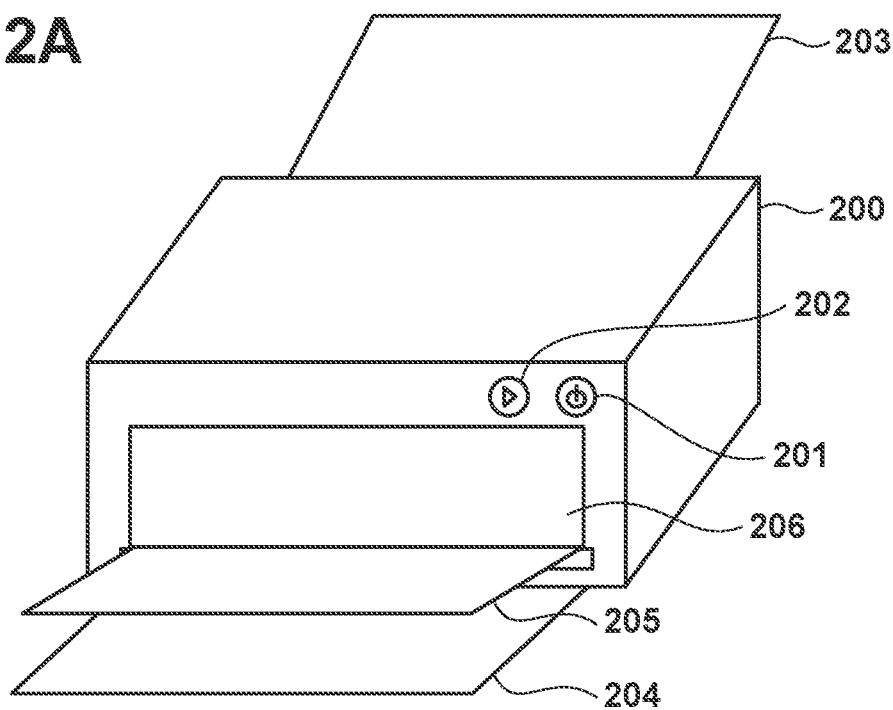
FIGS. 2A to 2C are views showing the outline of the outer appearance of a printing apparatus.
Figure 2B:
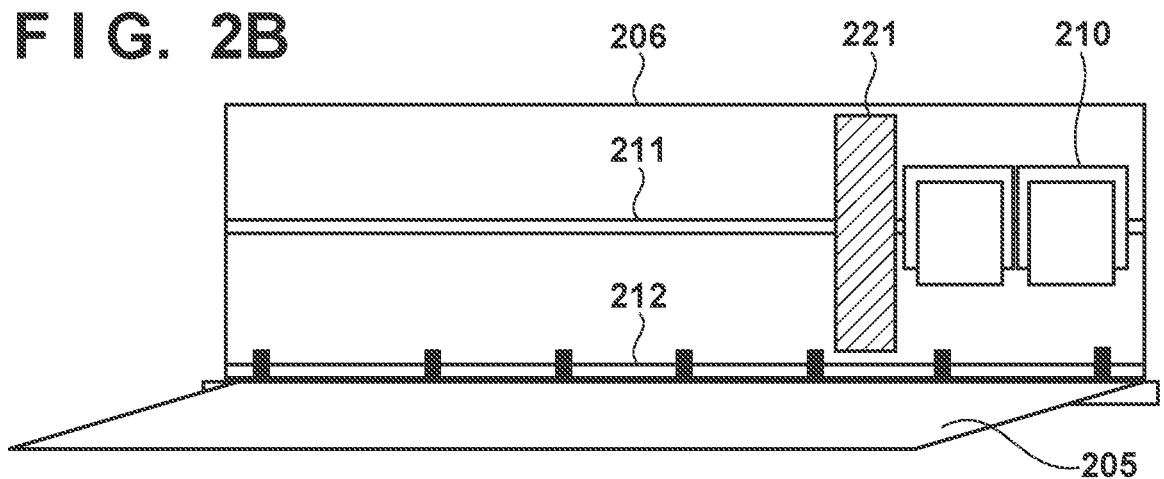
Figure 2C:
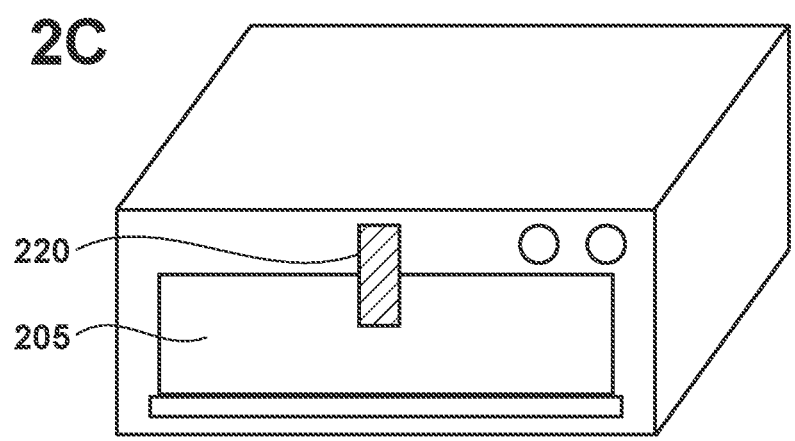

FIGS. 2A to 2C are views showing the outline of the outer appearance of the printing apparatus 151. FIG. 2A shows the outer appearance of the printing apparatus 151. The printing apparatus 151 includes a power button 201, a start button 202, a paper feed tray 203, a discharge tray 204, an access cover 205, and an opening portion 206. FIG. 2B shows the outline of the configuration in the opening portion 206 shown in FIG. 2A. The opening portion 206 shown in FIG. 2B is configured to appear when the access cover 205 is opened. An ink holder 210 is configured to hold ink tanks (ink cartridges) (not shown) and reciprocally move along a shaft 211 in the left-and-right direction in FIG. 2B. The ink tanks store, for example, cyan, magenta, yellow, and black inks, and the color inks are discharged from nozzles of a printhead (not shown) in which the ink tanks are mounted to a printing paper sheet. The printing paper sheet is fed by a paper feed roller 212. A fixing member 221 of the ink holder 210 is a member that fixes the ink holder 210 to prevent it from moving along the shaft 211 in the left-and-right direction to be damaged during transportation of the printing apparatus 151. FIG. 2C shows a state in which the printing apparatus 151 is taken out from the packaging box. A packing tape 220 is adhered to prevent the access cover 205 from opening to be damaged during transportation of the printing apparatus 151.

Setup processing of the printing apparatus 151 according to this embodiment will be described below. To allow the user to use the printing apparatus 151, after unpacking from the packaging box, a main body installation operation (setup operation) such as a work for stripping off the packing tape 220, a work for detaching the fixing member 221, and a work for attaching ink tanks needs to be performed. During the main body installation operation, linkage by communication is performed between the printing apparatus 151 and an application program (setup application) configured to perform the setup processing of the printing apparatus 151, which is executed by the information processing apparatus 101 such as a PC or a smartphone. For example, the information processing apparatus 101 acquires, at any time, state information representing the state of the printing apparatus 151, for example, whether the ink tanks are already attached, by the setup application in accordance with the progress of the procedure of the main body installation operation. On the setup application, the description of the procedure of the main body installation operation is displayed by at least one of a text, an image, and a moving image in accordance with the state of the printing apparatus 151 specified by the acquired state information. Setup processing according to the state of the printing apparatus 151, which is executed by the setup application when the user executes the main body installation operation, will be referred to as "linked setup processing" hereinafter.

In this embodiment, in a case where initial installation of the printing apparatus 151 is performed, processing of notifying, by the setup application, the user of a method of handling error cancel will be described.

Figure 3B:
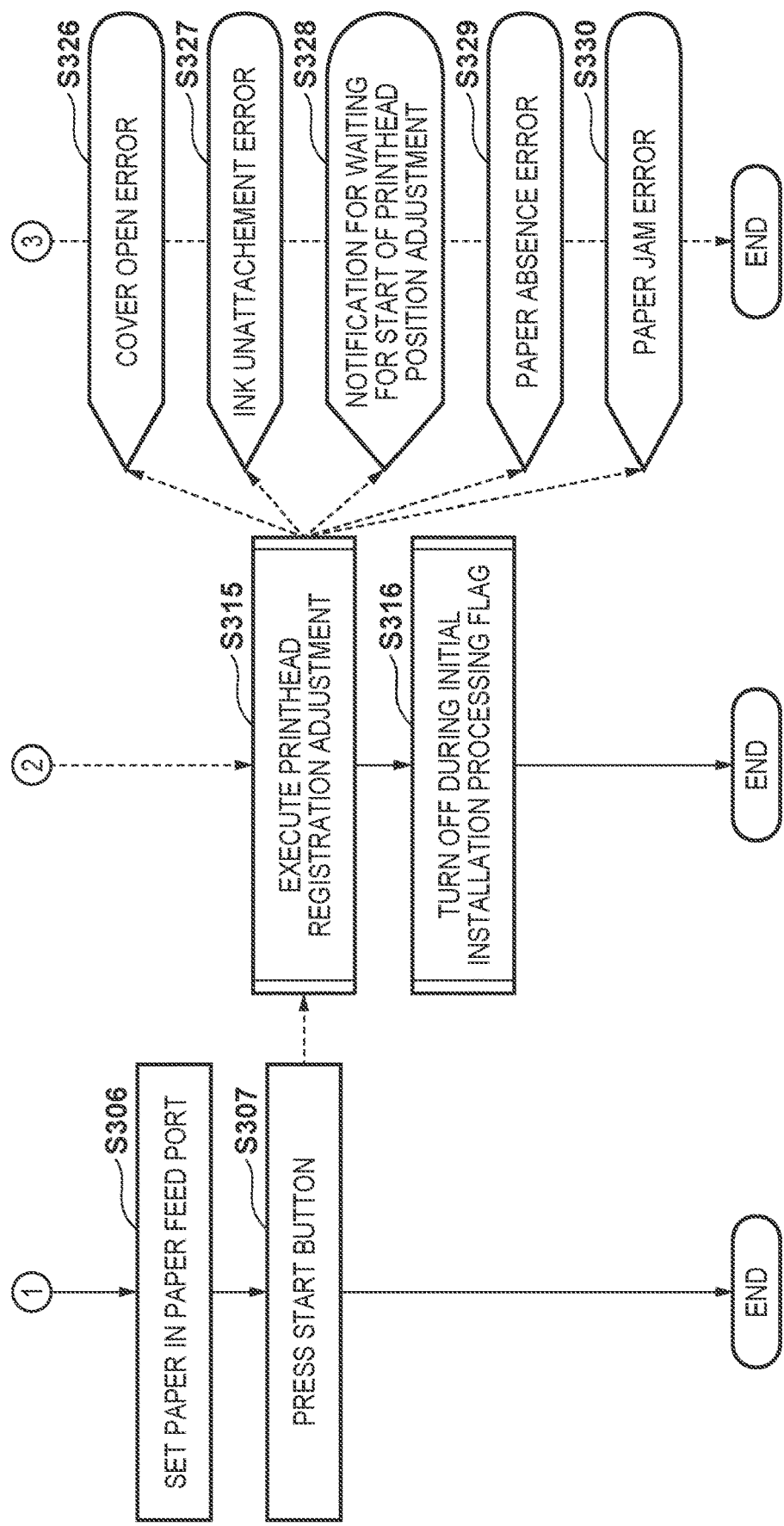

FIGS. 3A and 3B are sequence charts of linked setup processing. Linked setup processing includes a printer installation work to be executed by the user, initial installation processing to be executed by the printing apparatus 151, and printer state confirmation processing to be executed by the setup application on the information processing apparatus 101. The procedure of processing of each of the user, the printing apparatus 151, and the setup application on the information processing apparatus 101 will be described with reference to FIGS. 3A and 3B.

In step S301, when starting the printer installation work, the user first removes the ink holder fixing member 221 and the packing tape 220 in accordance with the procedure. Here, the procedure is the procedure presented by the maker to complete the initial installation of the printing apparatus 151, and is described in a manual or the like. The installation work of the printing apparatus 151 will be described hereinafter in accordance with the procedure. In step S302, the user presses the power button 201 of the printing apparatus 151 to power it on. The user opens the access cover 205 of the printing apparatus 151 in step S303, attaches inks in step S304, and closes the access cover 205 in step S305. After that, to prepare for printhead position adjustment, the user sets paper sheets in the paper feed tray 203 in step S306, and presses the start button 202 in step S307. If the printhead position adjustment is completed, the printer installation work by the user is ended.

Initial installation processing of the printer will be described next. According to pressing of the power button 201 of the printing apparatus 151 by the user in step S302, the printing apparatus 151 starts initial installation processing. If the initial installation processing is started, in step S311, the printing apparatus 151 turns on an initial installation processing flag ensured in a storage area such as the RAM 153 or the like. The initial installation processing flag is a flag indicating that initial installation processing is being executed in the printing apparatus 151. In step S312, the printing apparatus 151 makes a preparation for connection to the information processing apparatus 101. In step S312, for example, a state in which the printing apparatus 151 can be found from the information processing apparatus 101 is set. By the processing of step S312, a state in which the information processing apparatus 101 can be connected to the printing apparatus 151 is obtained.

In step S313, the printing apparatus 151 executes initialization processing of driving the ink holder 210 and the paper feed roller 212 and moving these to fixed positions. Here, if the information processing apparatus 101 is already connected to the printing apparatus 151, and printer state confirmation processing of the setup application is executed on the information processing apparatus 101, various kinds of errors and various kinds of power supply state information of the printing apparatus 151 are displayed on the display unit 108.

The setup application on the information processing apparatus 101 then acquires, from the printing apparatus 151, the information (also called device information) of the printing apparatus 151. The information of the printing apparatus 151 includes various kinds of error information and notification information to be described below. Also, the acquisition of the information of the printing apparatus 151 is performed based on a request from the setup application to the printing apparatus 151.

In step S313, if the ink holder fixing member 221 is not removed, the ink holder 210 cannot be driven. Hence, the printing apparatus 151 transmits an ink holder fixing member unremoval error to the information processing apparatus 101. In this case, in step S321, the setup application on the information processing apparatus 101 displays the ink holder fixing member unremoval error on the display unit 108. Also, if the access cover 205 remains open, the user's hand may be pulled in. Hence, the printing apparatus 151 cannot drive mechanisms such as the ink holder 210 and the paper feed roller 212 and cannot therefore execute the initialization processing of step S313. Hence, in this case, the printing apparatus 151 transmits a cover open error to the information processing apparatus 101, and in step S322, the setup application on the information processing apparatus 101 displays the cover open error on the display unit 108.

After the initialization processing of step S313 is completed, in step S314, the printing apparatus 151 executes printhead cleaning processing. At this time, in a state in which the access cover 205 of the printing apparatus 151 is open, or in a state in which no inks are attached, the printing apparatus 151 cannot execute printhead cleaning processing. Hence, in these states, the printing apparatus 151 transmits a cover open error or an ink unattachement error to the information processing apparatus 101. The setup application on the information processing apparatus 101 displays the cover open error on the display unit 108 in step S323, and displays the ink unattachement error in step S324. The printhead cleaning processing executed by the printing apparatus 151 continues for several minutes. During this time, the printing apparatus 151 transmits, to the information processing apparatus 101, information representing that the printhead cleaning processing is being executed. In step S325, the setup application on the information processing apparatus 101 displays, on the display unit 108, information representing that printhead cleaning is in progress.

Since the printing apparatus 151 starts printhead position adjustment execution processing in step S315, the user needs to set paper sheets in the paper feed port 203 in step S306 and press the start button 202 of the printing apparatus 151 in step S307. After step S314, if the operations of steps S306 and S307 by the user are not performed, the printing apparatus 151 transmits, to the information processing apparatus 101, a paper absence error and information representing that the apparatus is waiting for the start of printhead position adjustment. The setup application on the information processing apparatus 101 displays information representing that the apparatus is waiting for the start of printhead position adjustment on the display unit 108 in step S328, and displays the paper absence error in step S329. Also, if the access cover 205 is open, or inks are detached after step S314, the printing apparatus 151 transmits information representing these states to the information processing apparatus 101. The setup application on the information processing apparatus 101 displays the cover open error on the display unit 108 in step S326, and displays the ink unattachement error in step S327. If a paper jam occurs in the printing apparatus 151 in step S315, the printing apparatus 151 transmits information representing the state to the information processing apparatus 101, and the setup application on the information processing apparatus 101 displays a paper jam error on the display unit 108 in step S330. If various kinds of error information and notification information are not present, the printer state confirmation processing of the setup application on the information processing apparatus 101 is ended. On the other hand, after step S315, the printing apparatus 151 turns off the initial installation processing flag in step S316, thereby ending the initial installation processing.

Figure 4:
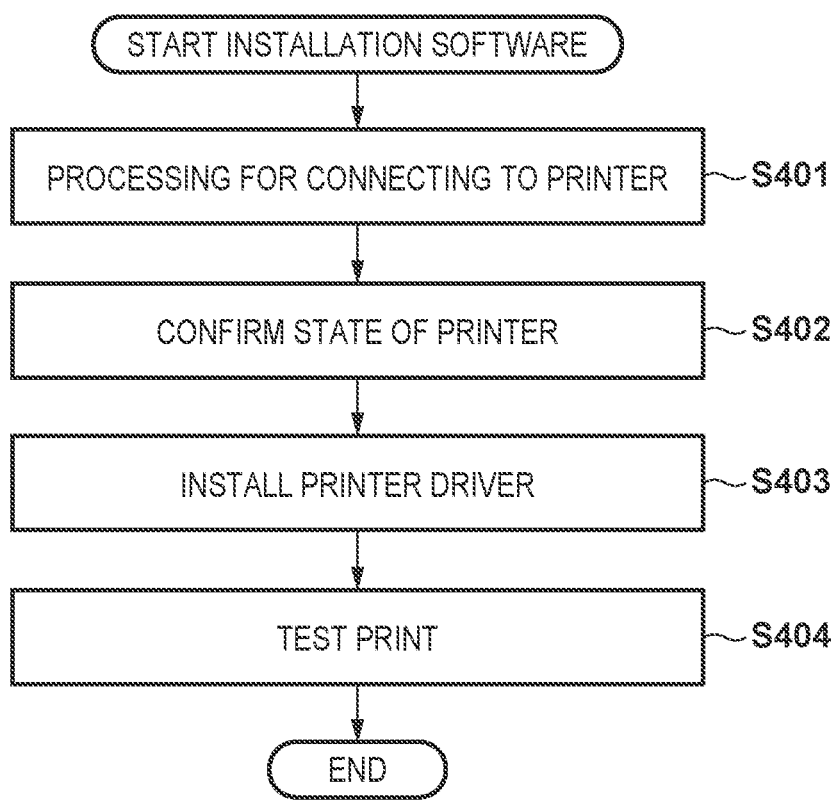
FIG. 4 is a flowchart showing processing of a setup application.

Processing of the setup application on the information processing apparatus 101 and screen transition will be described next with reference to FIGS. 4 and 5. FIG. 4 is a flowchart showing processing of the setup application. Processing shown in FIG. 4 is implemented by, for example, the CPU 103 reading out the setup application stored in the ROM 104 to the RAM 105 and executing it.

If the setup application is started by the user, in step S401, the CPU 103 performs processing for connecting to the printing apparatus 151. In step S401, the CPU 103 confirms whether a UBS-connected printer is found or a printer is found by network search, and displays a screen configured to make the user confirm whether to set the found printing apparatus 151 usable in the information processing apparatus 101. FIG. 5A shows an example of a screen 500 displayed in step S401.

If the user presses a next button 501 on the screen 500, in step S402, the CPU 103 confirms the state of the printing apparatus 151. Printer state confirmation processing of step S402 will be described later with reference to FIGS. 6A and 6B.

After step S402, in step S403, the CPU 103 performs installation processing of the printer driver. During the installation processing of the printer driver, the CPU 103 displays a screen 560 shown in FIG. 5G on the display unit 108. The screen 560 includes a progress bar 561 indicating the progress state of the installation processing.

Figures 5E, 5F, 5G, 5H:
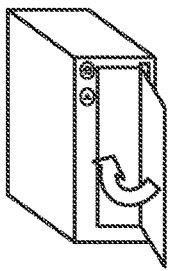

After step S403, in step S404, the CPU 103 displays a screen 570 shown in FIG. 5H on the display unit 108. The screen 570 includes a test print button 571 and an end button 572. If the user presses the test print button 571, the CPU 103 sends a test print execution instruction to the printing apparatus 151, and the printing apparatus 151 performs test print. If the user presses the end button 572, the processing shown in FIG. 4 is ended.

Figure 6A:
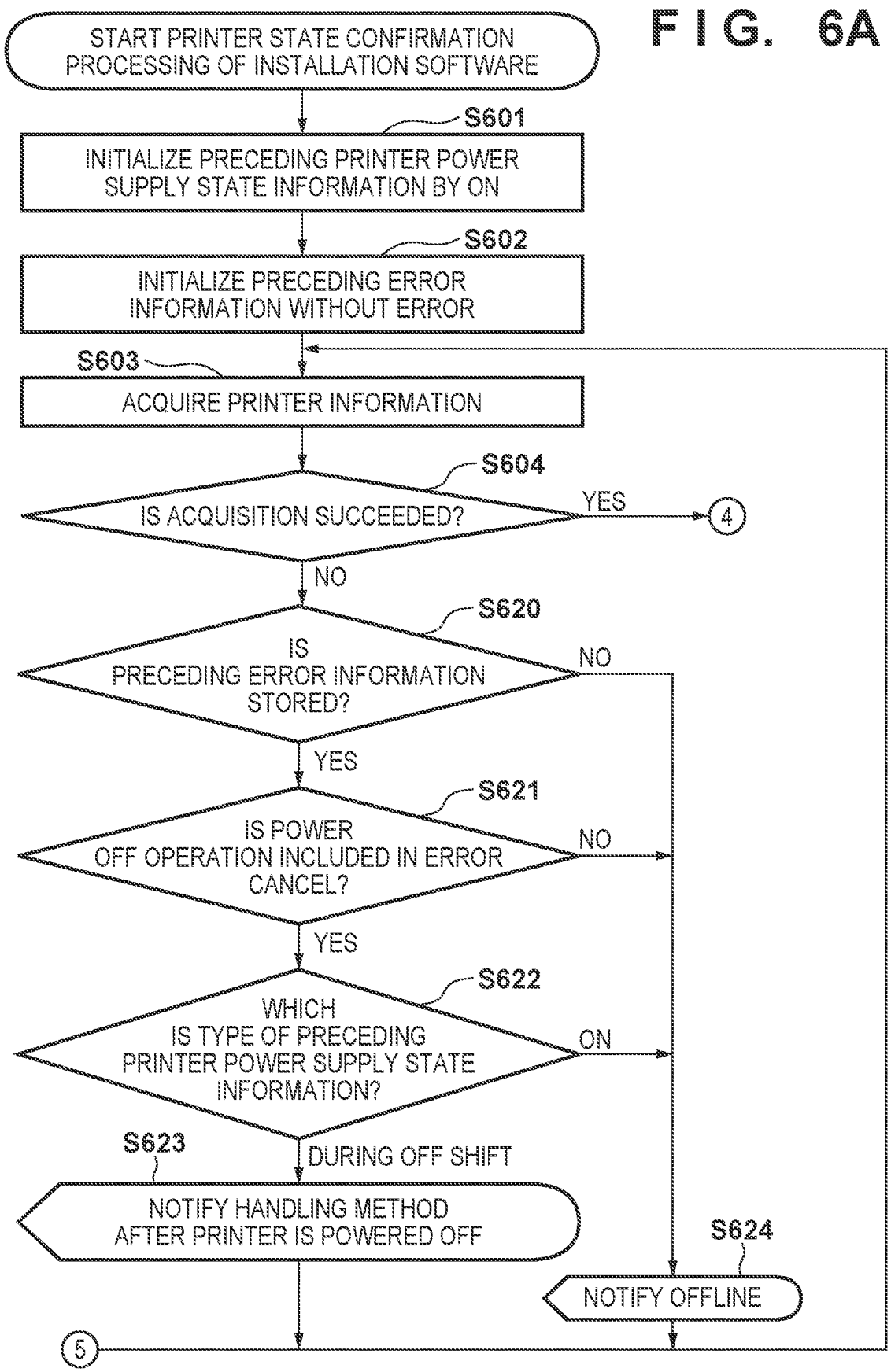
FIGS. 6A and 6B are flowcharts showing printer state confirmation processing.
Figure 6B:
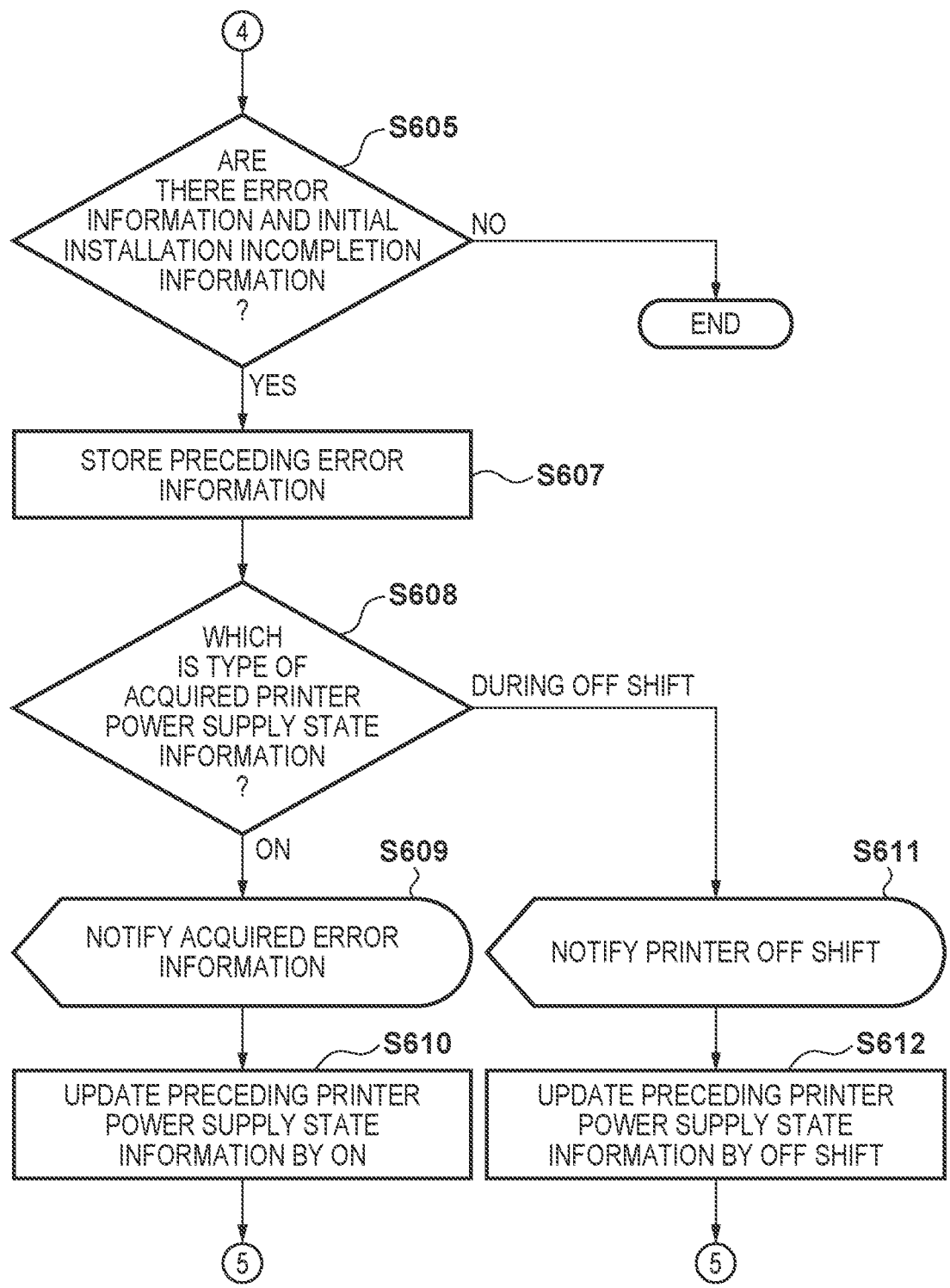

Printer state confirmation processing of step S402 will be described next with reference to FIGS. 5A to 5H, 6, and 7. FIGS. 6A and 6B are flowcharts showing printer state confirmation processing of the setup application. When starting the processing shown in FIGS. 6A and 6B, areas used to store "preceding printer power supply state information" (to be simply referred to as power supply state information hereinafter) and "preceding error information" (to be simply referred to as error information hereinafter) are allocated to a storage area such as the RAM 105.

Power supply state information is the power supply state information of the printing apparatus 151 found in step S401, and includes information representing a power ON state and information representing that the printing apparatus is shifting to a power OFF state. Note that the power ON state is a state in which power is being supplied to the entire printing apparatus 151, and power consumption is larger than in the power OFF state. More specifically, for example, the power ON state is a state in which power is being supplied to the CPU 154, the print engine 155, the communication unit 156, and the display unit 161. In other words, the power ON state is a state in which communication between the printing apparatus 151 and the information processing apparatus 101 is possible. The power OFF state is a state in which power is not being supplied to at least some components of the printing apparatus 151, and power consumption is smaller than in the power ON state. More specifically, for example, the power OFF state is a state in which power is being supplied to the CPU 154 but not to the print engine 155, the communication unit 156, and the display unit 161. In other words, the power OFF state is a state in which communication between the printing apparatus 151 and the information processing apparatus 101 is impossible. A state in which the printing apparatus is shifting to the power OFF state represents that a shift to the power OFF state in response to pressing of the power button 201 is in progress. Note that the state in which the printing apparatus is shifting to the power OFF state is a state in which power supply to the components of the printing apparatus 151 is sequentially stopped for the shift to the power OFF state, and power consumption is smaller than in the power ON state but larger than in the power OFF state. In this embodiment, however, the state in which the printing apparatus is shifting to the power OFF state is a state in which power supply to the communication unit 156 is not stopped, and communication between the printing apparatus 151 and the information processing apparatus 101 is possible. The power supply state information is acquired from the printing apparatus 151 and stored in the power supply state information area of the RAM 105 in the processing shown in FIGS. 6A and 6B. As will be described later, in the processing shown in FIGS. 6A and 6B, it may be impossible to acquire the power supply state information from the printing apparatus 151 because the printing apparatus 151 shifts to the power OFF state. In this case, power supply state information stored in the power supply state information area before is referred to.

The error information is error information that occurs in the printing apparatus 151 found in step S401, and includes various kinds of error information as described with reference to FIGS. 3A and 3B. The error information is acquired from the printing apparatus 151 in the processing shown in FIGS. 6A and 6B, and is stored in the error information area of the RAM 105. As will be described later, in the processing shown in FIGS. 6A and 6B, it may be impossible to acquire the error information from the printing apparatus 151 because the printing apparatus 151 shifts to the power OFF state. In this case, error information stored in the error information area before is referred to.

If the printer state confirmation processing is started, in step S601, the CPU 103 stores "ON" as the initial value of power supply state information in the power supply state information area. In step S602, the CPU 103 stores information representing "error absence" as the initial value of error information in the error information area. In step S603, the CPU 103 acquires, from the printing apparatus 151, the information of the printing apparatus 151. The information of the printing apparatus 151 acquired in step S603 includes the error information, the power supply state information, and initial installation incompletion information. The initial installation incompletion information is information represented by the initial installation processing flag described with reference to FIGS. 3A and 3B, and is information representing that initial installation is incomplete. That is, the initial installation processing flag that is ON corresponds to the initial installation incompletion information, and if the initial installation processing flag is ON, the setup application can recognize that initial installation is incomplete. Note that the error information and the initial installation incompletion information may not be included in the information of the printing apparatus 151. Also, the error information includes not only error information such as a packing material unremoval error described with reference to FIGS. 3A and 3B but also notification information such as a printhead cleaning processing notification.

In step S604, the CPU 103 determines whether the acquisition of the information of the printing apparatus 151 succeeds. For example, if the CPU 103 requests the information of the printing apparatus 151 from the printing apparatus 151 but receives no response, it determines that the acquisition of the information of the printing apparatus 151 fails. Note that the case where the acquisition of the information of the printing apparatus 151 fails corresponds to a case where, for example, the printing apparatus 151 is offline. The case where the printing apparatus 151 is offline corresponds to a case where the printing apparatus 151 does not belong to the network to which the information processing apparatus 101 belongs, and communication between the printing apparatus 151 and the information processing apparatus 101 cannot be executed. If it is determined that the acquisition of the information of the printing apparatus 151 succeeds, in step S605, the CPU 103 determines whether the information acquired from the printing apparatus 151 includes error information and initial installation incompletion information. Note that the case where the acquisition of the information of the printing apparatus 151 succeeds corresponds to a case where, for example, the printing apparatus 151 is online. The case where the printing apparatus 151 is online corresponds to a case where the printing apparatus 151 belongs to the network to which the information processing apparatus 101 belongs, and communication between the printing apparatus 151 and the information processing apparatus 101 can be executed. If it is determined that error information and initial installation incompletion information are absent, no error occurs in the printing apparatus 151, and initial installation is completed. Hence, the processing shown in FIGS. 6A and 6B is ended. After the end of FIGS. 6A and 6B, the process advances to the processing of step S403 in FIG. 4. On the other hand, if it is determined that error information and initial installation incompletion information are present, in step S607, the CPU 103 stores, in the error information area, the error information acquired in step S603. Note that since this determination need only be processing of determining whether the printing apparatus 151 is online or offline, details of the determination are not limited. For example, if the power OFF state is a state in which although communication is possible, the printing apparatus 151 cannot confirm the detailed status of itself, the acquisition of the information of the printing apparatus 151 may succeed even in the power OFF state. As the information of the printing apparatus 151, information representing that the apparatus in the power OFF state may be acquired. In a case of this form, in this determination, it may be determined whether the acquired information of the printing apparatus 151 represents the power OFF state, and it may be determined whether the printing apparatus 151 is online or offline.

In step S608, using the information acquired from the printing apparatus 151, the CPU 103 determines the type of the power supply state information. That is, it is determined whether the power supply state information represents the power ON state or the state in which the printing apparatus is shifting to the power OFF state.

If it is determined in step S608 that the power supply state information represents the power ON state, in step S609, the CPU 103 displays a screen based on the acquired error information on the display unit 108. Here, as the screen based on the acquired error information, a screen associated with an error that is an error corresponding to the acquired error information and occurs in the printing apparatus 151 is displayed. More specifically, the screen associated with the error is a screen showing an operation for canceling (resolving) the error or a screen showing that the error occurs in the printing apparatus 151. Also, for example, the screen is a screen including a button used to display, on a web browser or the like, the screen showing the operation for eliminating (canceling) the error. FIG. 5B shows an example of a display screen that displayed in step S609 in a case where a paper jam error occurs in the printing apparatus 151. On a screen 510, a support number indicating an error type and an error handling method (an operation method for eliminating (canceling) the error) are displayed. Note that if the user cannot pull out paper since the paper jams inside the printing apparatus 151, the user may need to power off and on the printing apparatus 151 to remove the paper. Hence, a guidance of the power-OFF operation of the printing apparatus 151 is also displayed on the screen 510. Note that there are a plurality of paper jam error canceling methods, and an operation guidance is displayed for each of the plurality of methods. The power-OFF operation of the printing apparatus 151 is included in operations for methods that should be executed if the paper jam cannot be canceled by any other method. That is, as the operation of canceling the paper jam, the power-OFF operation of the printing apparatus 151 is not always executed. If the error based on the acquired error information is an error different from the paper jam error and does not include the power-OFF operation in the cancel operation, a screen that shows an operation of eliminating the error and does not include the guidance of the power-OFF operation of the printing apparatus 151 is displayed. Errors that do not include the power-OFF operation in the cancel operation are, for example, a packing material unremoval error, a cover open error, an ink unattachement error, and a paper absence error. In step S610, the CPU 103 updates the power supply state information in the power supply state information area by "ON". After step S610, the process returns to step S603 to acquire the information of the printing apparatus 151 again.

If it is determined in step S608 that the power supply state information represents the state in which the printing apparatus is shifting to the power OFF state, in step S611, the CPU 103 displays, on the display unit 108, a screen showing the state in which the printing apparatus 151 is shifting to the power OFF state. FIG. 5C shows an example of the screen displayed in step S611. A screen 520 shown in FIG. 5C is displayed in a case where, for example, the user presses the power button 201 of the printing apparatus 151 in accordance with the guidance on the screen 510, and the printing apparatus 151 transitions from the power ON state to the state in which the printing apparatus is shifting to the power OFF state. In step S612, the CPU 103 updates the power supply state information in the power supply state information area by "OFF shift". After step S612, the process returns to step S603 to acquire the information of the printing apparatus 151 again. Note that the state in which the printing apparatus is shifting to the power OFF state may not be taken into consideration, and steps S608, S611, and S612 may not be included. That is, the process may always advance to step S609 after step S607.

As described above, in this embodiment, the error information and the power supply state information acquired from the printing apparatus 151 are stored in the storage areas such that the pieces of information can be referred to from the storage areas if they cannot be acquired from the printing apparatus 151 in the subsequent processing shown in FIGS. 6A and 6B. With this configuration, it is possible to judge that the reason why information cannot be acquired from the printing apparatus 151 is pressing of the power button 201 by the user for error cancel.

If it is determined in step S604 that the acquisition of the information of the printing apparatus 151 fails, in step S620, the CPU 103 determines whether error information is stored in the error information area. If it is determined that error information is stored in the error information area, in step S621, the CPU 103 determines, based on the stored error information, whether the power-OFF operation of the printing apparatus 151 is included in the error cancel operation. Here, as for whether the power-OFF operation is included in the error cancel operation, information that associates each error information with information representing whether the power-OFF operation is included may be held by the setup application itself in advance. Alternatively, the printing apparatus 151 may hold the information in advance and transmit, to the information processing apparatus 101, information concerning whether the power-OFF operation is included in cancel of the error that occurs in the printing apparatus 151. For example, in step S603, the CPU 103 may acquire the information from the printing apparatus 151.

If it is determined in step S621 that the power-OFF operation is included in the error cancel operation, in step S622, the CPU 103 determines the type of the power supply state information in the power supply state information area. That is, it is determined whether the power supply state information is "ON" or "OFF shift".

If it is determined in step S622 that the power supply state information represents that the printing apparatus is shifting to the power OFF state, it is judged that the information of the printing apparatus 151 cannot be acquired because the shift of the printing apparatus 151 to the power OFF state is completed. In step S623, the CPU 103 displays, on the display unit 108, a screen configured to notify the user of a handling method after power-OFF. The CPU 103 does not execute display of a screen of offline notification, which is executed in step S624 to be described later, even if the printing apparatus 151 is in the power OFF state, and communication between the information processing apparatus 101 and the printing apparatus 151 is impossible. FIGS. 5D and 5E show examples of the screen displayed in step S623. For example, after the screen 520 shown in FIG. 5C is displayed, if the printing apparatus 151 transitions from the state in which the printing apparatus is shifting to the power OFF state to the power OFF state, it is determined in step S604 that the acquisition of the information of the printing apparatus 151 fails, and a screen S30 shown in FIG. 5D is displayed in step S623. On the screen S30 shown in FIG. 5D, an operation guidance to open the access cover 205 and pull out paper is displayed as a handling method necessary immediately after the user powers off the printing apparatus 151. The screen S30 includes a next button S31. If the user presses the button S31, a screen S40 shown in FIG. 5E is displayed. On the screen S40 shown in FIG. 5E, an operation guidance to close the access cover 205, set paper again, and power on the printing apparatus 151 is displayed as a handling method necessary after the user pulls out the paper. After step S623, the process returns to step S603 to acquire the information of the printing apparatus 151 again. Note that after step S623, the process may return to step S603 after waiting for the elapse of a predetermined time by a timer, or the processing of step S603 may be retried a predetermined number of times.

A configuration for displaying the handling method after power-OFF in two screens in step S623 has been described above. However, the handling method after power-OFF may be displayed in one screen. Also, in a configuration for displaying web content, browsing software (browser) may be activated to separately display web content showing a handling method.

As described above, in this embodiment, if the information of the printing apparatus 151 cannot be acquired after the printing apparatus 151 shifts to the power OFF state, it is determined whether the error of the stored error information is an error including the power-OFF operation after error cancel. If it is determined that it is an error including the power-OFF operation after error cancel, it is determined whether the stored power supply state information is "OFF shift". If it is determined that the power supply state information is "OFF shift", it is judged that the reason why the information of the printing apparatus 151 cannot be acquired is pressing of the power button 201 of the printing apparatus 151 for error cancel, and the screen configured to notify the user of the handling method after power-OFF is displayed. With this configuration of display control, it is possible to notify the user of the handling method necessary after power-OFF.

If it is determined in step S622 that the power supply state information is "ON", it is judged that the reason why the information of the printing apparatus 151 cannot be acquired is not completion of the shift of the printing apparatus 151 to the power OFF state but disconnection of the connection path between the information processing apparatus 101 and the printing apparatus 151. For this reason, in step S624, the CPU 103 displays a screen of offline notification on the display unit 108. The screen of offline notification is a screen configured to notify the user of an error that communication between the information processing apparatus 101 and the printing apparatus 151 cannot be performed. For example, assume that in step S609, after the screen 510 shown in FIG. 5B is displayed, the user erroneously removes, from the information processing apparatus 101, a USB cable used for connection to the printing apparatus 151, or network connection by Wi-Fi becomes unstable due to radio wave interference or the like. If the information of the printing apparatus 151 cannot be acquired in step S603 due to such a reason, the possibility that the printing apparatus 151 is in the power ON state is high. In a case where the connection path between the information processing apparatus 101 and the printing apparatus 151 is disconnected, if the notification of the handling method after power-OFF is done, the user cannot appropriately cancel the error. Hence, in step S624, the screen of offline notification is displayed. FIG. 5F shows an example of the screen displayed in step S624. If a screen 550 shown in FIG. 5F is displayed, the user can be caused to confirm connection between the printing apparatus 151 and the information processing apparatus 101. The screen 550 shown in FIG. 5F includes a manual button 551. If the user presses the button 551, the CPU 103 activates the browser to display web content (not shown) showing a handling method for recovering the connection path between the information processing apparatus 101 and the printing apparatus 151. After step S623, the process returns to step S603 to acquire the information of the printing apparatus 151 again. Note that after step S624, the process may return to step S603 after waiting for the elapse of a predetermined time by a timer, or the processing of step S603 may be retried a predetermined number of times.

If it is determined in step S620 that error information is not stored in the error information area, a screen of offline notification is displayed in step S624. This corresponds to a case where, for example, since the connection path between the information processing apparatus 101 and the printing apparatus 151 is disconnected immediately after connection processing with the printing apparatus 151 is completed in step S401, step S604 ends with "NO" without performing error information storage in step S607, and the process advances to step S620.

If it is determined in step S621 that the power-OFF operation is included in the error information, a screen of offline notification is displayed in step S624. This corresponds to a case where, for example, after an error information notification is made in step S609 in a state in which an error such as a paper absence error for which the power-OFF operation is not included in the error cancel operation occurs in the printing apparatus 151, the connection path between the information processing apparatus 101 and the printing apparatus 151 is disconnected. In this case, step S604 ends with "NO", the process advances to step S621 to determine that the power-OFF operation is not included in the error information, and the screen of offline notification is displayed in step S624.

As described above, according to this embodiment, if the printing apparatus 151 changes to the power OFF state after detection of an error for which the power-OFF operation is included in error cancel, a handling method necessary after power-OFF is notified. With this configuration, the user can complete the series of error cancel procedures until after power-OFF. Also, in this case, since the screen of offline notification is not displayed, it is possible to prevent the user from being confused by the display of the screen of offline notification after performing an operation according to the procedure of the guidance.

Second Embodiment

The second embodiment will be described below with respect to points different from the first embodiment. In the first embodiment, the configuration for performing initial installation of the printing apparatus 151 by a setup application has been described. In the second embodiment, a configuration for notifying a user of an error cancel procedure in a case where an error occurs when performing printing by a printer driver will be described.

Figure 7:
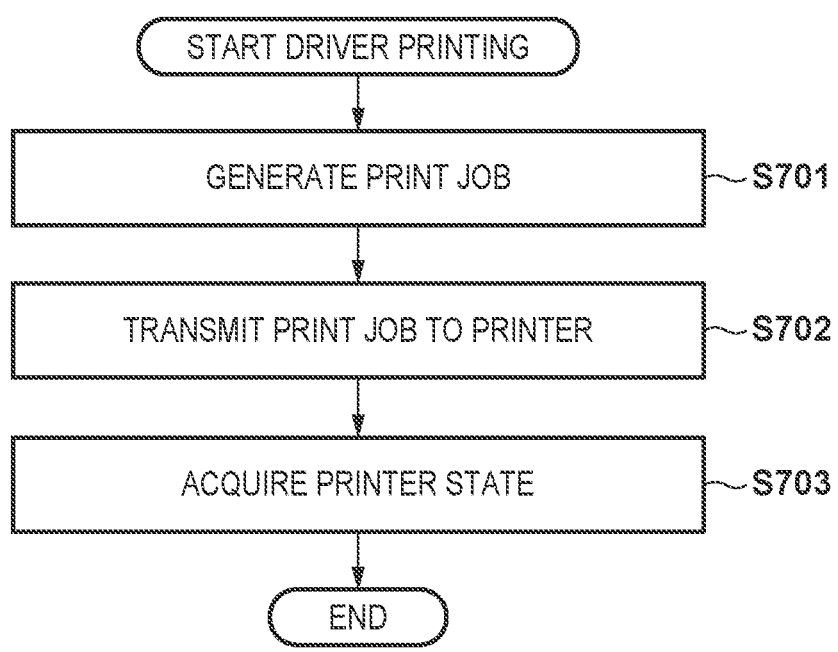
FIG. 7 is a flowchart showing processing of a printer driver.

FIG. 7 is a flowchart showing processing of a printer driver. Processing shown in FIG. 7 is implemented by, for example, a CPU 103 reading out a program stored in a ROM 104 to a RAM 105 and executing it.

If the user inputs a print instruction from an application on an information processing apparatus 101, and processing by the printer driver is started, the CPU 103 performs print job generation processing based on data transferred from the application. In step S702, the CPU 103 transmits the generated print job to a printing apparatus 151. Next, in step S703, the CPU 103 acquires the state of the printing apparatus 151. After step S703, the processing shown in FIG. 7 is ended.

Processing of acquiring the state of the printing apparatus 151 in step S703 will be described next with reference to FIGS. 6 and 8. Here, a case where the user starts printing by the printer driver in a state in which an ink cartridge is not completely attached to an ink holder 210 of the printing apparatus 151 will be described as an example. In step S703, processing shown in FIGS. 6A and 6B is executed. In the first embodiment, the processing shown in FIGS. 6A and 6B is executed by the setup application. In the second embodiment, however, the processing is executed by the printer driver.

If the user starts printing by the printer driver, the print job is transmitted to the printing apparatus 151 in step S702, and the printing apparatus 151 thus starts print processing. A case where when driving the ink holder 210 during print processing, the printing apparatus 151 detects an abnormality, and an ink holder error occurs will be described below.

In the information processing apparatus 101, the processing shown in FIGS. 6A and 6B is started by the printer driver as step S703 in FIG. 7. In step S601, the CPU 103 stores "ON" as the initial value of power supply state information in a power supply state information area. In step S602, the CPU 103 stores "error absence" as the initial value of error information in an error information area. In step S603, the CPU 103 acquires the information of the printing apparatus 151. In step S604, the CPU 103 determines whether the acquisition of the information of the printing apparatus 151 succeeds.

If it is determined in step S604 that the acquisition of the information of the printing apparatus 151 succeeds, in step S605, the CPU 103 determines whether the information acquired from the printing apparatus 151 includes error information.

In the first embodiment, it is determined in step S605 whether initial installation incompletion information is included in addition to error information. In the second embodiment, determination about initial installation incompletion information is not performed. If it is determined that ink holder error information exists, in step S607, the CPU 103 stores the ink holder error information in the error information area. In step S608, using the information acquired from the printing apparatus 151, the CPU 103 determines the type of the power supply state information. As in the first embodiment, it is determined whether the power supply state information represents a power ON state or a state in which the printing apparatus is shifting to a power OFF state.

Figure 8A:
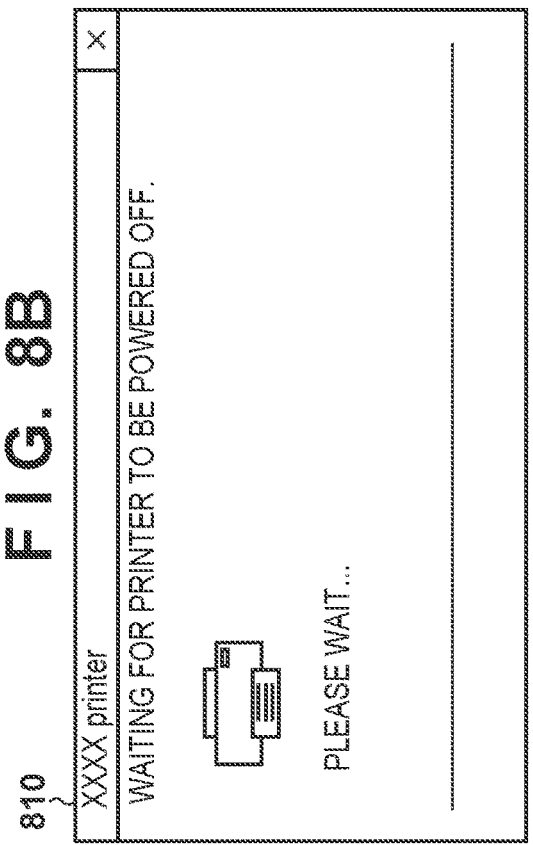
FIGS. 8A to 8D are views showing screens displayed by the printer driver.

If it is determined in step S608 that the power supply state information represents the power ON state, in step S609, the CPU 103 displays the acquired ink holder error information on a display unit 108. FIG. 8A shows an example of a screen displayed in step S609. A screen 800 shown in FIG. 8A is an example of the display screen of the printer driver in a case where an ink holder error occurs in the printing apparatus 151, and a support number indicating an error type and an error handling method are displayed. Note that if the ink holder error occurs, the user needs to power off and on the printing apparatus 151 to cancel the error. Hence, a guidance of the power-OFF operation of the printing apparatus 151 is displayed on the screen 800. In addition, the screen 800 includes a print stop button 801. If the user presses the button 801, the printer driver causes the printing apparatus 151 to stop the print job transmitted in step S702. In step S610, the CPU 103 updates the power supply state information in the power supply state information area by "ON". After step S610, the process returns to step S603 to acquire the information of the printing apparatus 151 again.

Figure 8B:
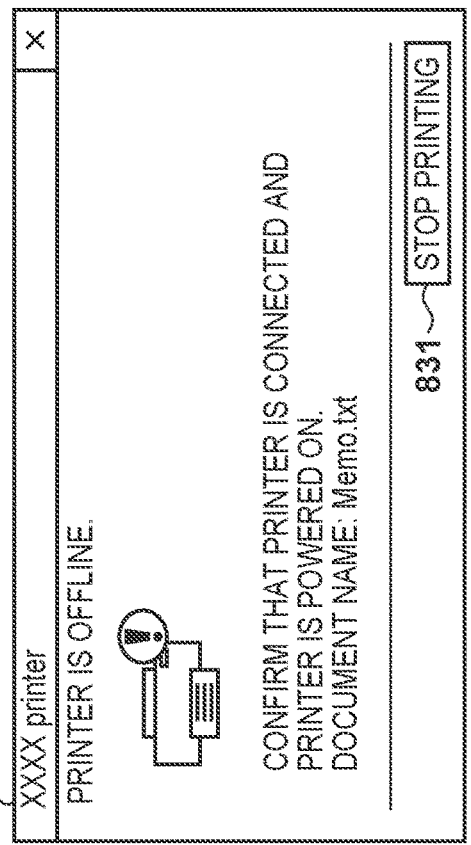

If the user presses a power button 201 of the printing apparatus 151 in accordance with the guidance of the power-OFF operation of the printing apparatus 151 displayed on the screen 800, the printing apparatus 151 transitions from the power ON state to a state in which the printing apparatus is shifting to the power OFF state. In this case, the process advances to steps S603, S604, S605, S607, and S608, and it is determined in step S608 that the state is "OFF shift". In step S611, the CPU 103 displays, on the display unit 108, a screen for notifying the user that the printing apparatus 151 is shifting to the power OFF state. FIG. 8B shows an example of the screen displayed in step S611. A screen 810 shown in FIG. 8B is displayed in a case where, for example, the user presses the power button 201 of the printing apparatus 151 in accordance with the guidance on the screen 800, and the printing apparatus 151 transitions from the power ON state to the state in which the printing apparatus is shifting to the power OFF state. In step S612, the CPU 103 updates the power supply state information in the power supply state information area by "OFF shift". After step S612, the process returns to step S603 to acquire the information of the printing apparatus 151 again.

The printing apparatus 151 transitions from the state in which the printing apparatus is shifting to the power OFF state to the power OFF state. In this case, the process advances from step S603 to step S604, and it is determined in step S604 that the acquisition of the information of the printing apparatus 151 fails. Since the ink holder error is stored in step S607, in step S620, the CPU 103 determines that error information is stored in the error information area, and the process advances to step S621.

In step S621, the CPU 103 determines, based on the stored error information, whether the power-OFF operation of the printing apparatus 151 is included in the error cancel operation. Here, as for whether the power-OFF operation is included in the error cancel operation, information that associates each error information with information representing whether the power-OFF operation is included may be held by the printer driver itself in advance. Alternatively, the printing apparatus 151 may hold the information in advance and transmit, to the information processing apparatus 101, information concerning whether the power-OFF operation is included in cancel of the error that occurs in the printing apparatus 151. For example, in step S603, the CPU 103 may acquire the information from the printing apparatus 151. Here, the CPU 103 determines that the power-OFF operation of the printing apparatus 151 is included in the cancel operation of the ink holder error, and advances to step S622.

In step S622, the CPU 103 determines the type of the power supply state information in the power supply state information area. That is, it is determined whether the power supply state information is "ON" or "OFF shift". Here, it is determined that the information represents "OFF shift", and the process advances to step S623.

In step S623, the CPU 103 judges that the information of the printing apparatus 151 cannot be acquired because the shift of the printing apparatus 151 to the power OFF state is completed, and displays, on the display unit 108, a screen configured to notify the user of a handling method after power-OFF. The CPU 103 does not execute display of a screen of offline notification, which is executed in step S624, even if the printing apparatus 151 is in the power OFF state, and communication between the information processing apparatus 101 and the printing apparatus 151 is impossible.

Figure 8C:
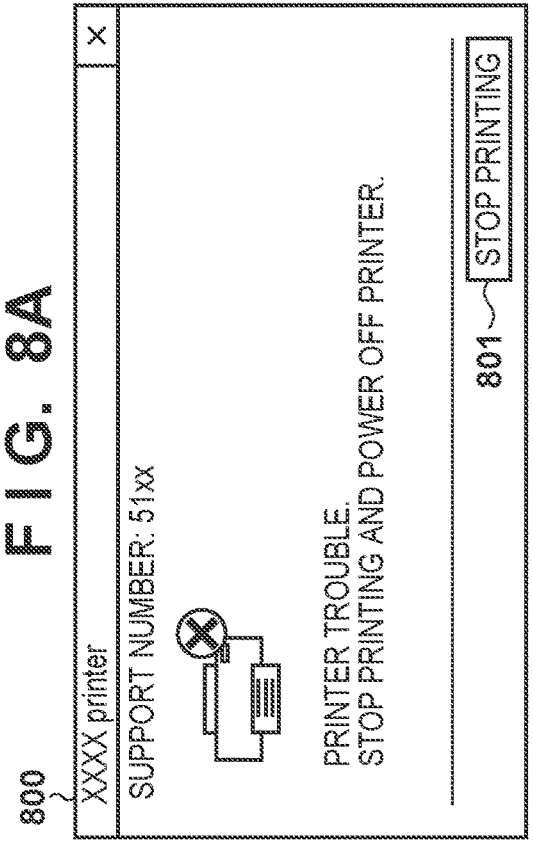

FIG. 8C shows an example of a screen displayed in step S623. A screen 820 shown in FIG. 8C includes a manual button 821. If the user presses the button 821, the CPU 103 activates the browser to display web content showing a detailed procedure of a handling method after power-OFF. After step S623, the process returns to step S603 to acquire the information of the printing apparatus 151 again.

If the user executes the handling method after power-OFF while referring to the web content, the printing apparatus 151 is set in the power ON state. Then, the process advances to steps S603, S604, and S605. In step S605, the CPU 103 determines that error information is not included in the information acquired from the printing apparatus 151, and the processing shown in FIGS. 6A and 6B is ended.

As described above, in this embodiment, if an error that needs the power-OFF operation to cancel the error occurs in the printing apparatus 151 when printing is executed by the printer driver, the processing shown in FIGS. 6A and 6B is executed by the printer driver. As a result, if the printing apparatus 151 changes to the power OFF state after detection of an error for which the power-OFF operation is included to cancel the error, a handling method necessary after power-OFF is notified. With this configuration, the user can complete the series of error cancel procedures until after power-OFF.

A case where the user starts printing by the printer driver in a state in which the connection path between the information processing apparatus 101 and the printing apparatus 151 is disconnected will be described next. In this case, even if the processing of step S702 is executed, printing is not started in the printing apparatus 151 because the connection path is disconnected.

Figure 8D:
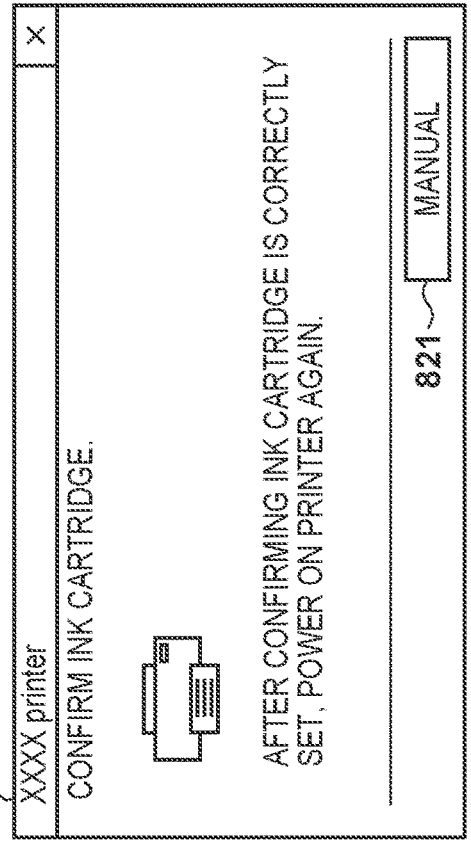

In the printer driver, in step S703, the processing shown in FIGS. 6A and 6B is started. After steps S601, S602, and S603, in step S604, the CPU 103 determines that the acquisition of the information of the printing apparatus 151 fails, and advances to step S620. In this case, since error information storage in step S607 is not performed, in step S620, the CPU 103 determines that error information is not stored in the error information area, and advances to step S624. In step S624, the CPU 103 displays a screen of offline notification on the display unit 108. FIG. 8D shows an example of a screen displayed in step S624. A screen 830 shown in FIG. 8D includes a print stop button 831. If the user presses the button 831, the printer driver deletes the print job generated in step S701. After step S624, the process returns to step S603 to acquire the information of the printing apparatus 151 again.

As described above, according to this embodiment, if the printing apparatus 151 changes to the power OFF state after detection of an error for which the power-OFF operation is included in error cancel, a handling method necessary after power-OFF is notified by the printer driver. With this configuration, the user can complete the series of error cancel procedures until after power-OFF. Also, in this case, since the screen of offline notification is not displayed, it is possible to prevent the user from being confused by the display of the screen of offline notification after performing an operation according to the procedure of the guidance.

Third Embodiment

The third embodiment will be described below with respect to points different from the first and second embodiments. In the second embodiment, the configuration in which one user performs printing from the printer driver has been described. However, even if a plurality of users perform printing from printer drivers in information processing apparatuses 101 of their own, the same effect as the effect of the second embodiment can be obtained. Initial installation of a printing apparatus 151 is often executed by one user. In printing after initial installation, a plurality of users alternately share the printing apparatus 151 in some cases. In this embodiment, a case where a plurality of users alternately perform printing from the printer driver in the configuration according to the second embodiment will be described. Note that in this embodiment, the printer driver of the printing apparatus 151 is installed in the information processing apparatus 101 of each of the plurality of users, and the processes shown in FIGS. 6 and 7 are executed by each printer driver.

Assume that a user A executes printing in the printing apparatus 151 from the printer driver, and an ink holder error occurs. Processing performed when a user B executes a print instruction from the application of the information processing apparatus 101 of his/her own in a state in which the user A executes power-OFF of the printing apparatus 151 without canceling the error will be described.

If the user B inputs a print instruction from an application, and processing by the printer driver is thus started, a CPU 103 performs print job generation processing in step S701 of FIG. 7. In step S702, the CPU 103 transmits the generated print job to the printing apparatus 151. In step S703, the CPU 103 acquires the state of the printing apparatus 151.

In the information processing apparatus 101 of the user B, the processing shown in FIGS. 6A and 6B is started by the printer driver as step S703 of FIG. 7. After steps S601 to S603, in step S604, the CPU 103 determines whether the acquisition of the information of the printing apparatus 151 succeeds. Here, in this case, since the power-OFF of the printing apparatus 151 is executed by the user A, it is determined in step S604 that the acquisition of the information of the printing apparatus 151 fails.

In step S620, the CPU 103 determines whether error information is stored in the error information area. Here, since error information storage is not performed in step S607, it is determined that error information is not stored, and the process advances to step S624. In step S624, the CPU 103 displays a screen of offline notification on a display unit 108.

The user B who sees a guidance on a screen 830 shown in FIG. 8D, which is displayed in step S624, performs a power ON operation of the printing apparatus 151. After step S624, the CPU 103 acquires the information of the printing apparatus 151 again in step S603. In this case, since the printing apparatus 151 in the power ON state, it is determined in step S604 that the acquisition of the information of the printing apparatus 151 succeeds. At this time, since error cancel is not performed yet in the printing apparatus 151, the information of the printing apparatus 151 includes error information, here, ink holder error information.

In step S605, the CPU 103 determines whether the information acquired from the printing apparatus 151 includes error information. In this case, since the ink holder error information is included in the information of the printing apparatus 151, it is determined that error information is included. In step S607, the CPU 103 stores the ink holder error information acquired in step S603 in the error information area.

Since the printing apparatus 151 in the power ON state, it is determined in step S608 that the power supply state information represents the power ON state. In step S609, the CPU 103 displays the acquired ink holder error information, for example, a screen 800 shown in FIG. 8A on the display unit 108. In step S610, the CPU 103 updates the power supply state information in the power supply state information area by "ON".

The user B who sees a guidance on the screen 800 shown in FIG. 8A, which is displayed in step S609, executes a power-OFF operation of the printing apparatus 151. After step S610, the CPU 103 acquires the information of the printing apparatus 151 again in step S603. At this time, the power supply state information included in the information of the printing apparatus 151 represents the state in which the printing apparatus is shifting to the power OFF state. Hence, after steps S605 and S607, it is determined in step S608 that the power supply state information represents the state in which the printing apparatus is shifting to the power OFF state, and in step S611, the CPU 103 displays, on the display unit 108, a screen showing the state in which the printing apparatus 151 is shifting to the power OFF state. In step S612, the CPU 103 updates the power supply state information in the power supply state information area by "OFF shift". After step S612, the process returns to step S603 to acquire the information of the printing apparatus 151 again.

Here, since the printing apparatus 151 in the power OFF state, it is determined in step S604 that the acquisition of the information of the printing apparatus 151 fails. Also, since the ink holder error is stored in step S607, it is determined in step S620 that error information is stored in the error information area. In step S621, it is determined that the power-OFF operation of the printing apparatus 151 is included in the error cancel operation. In step S622, it is determined that the power supply state information represents the state in which the printing apparatus is shifting to the power OFF state. In step S623, the CPU 103 judges that the information of the printing apparatus 151 cannot be acquired because the shift of the printing apparatus 151 to the power OFF state is completed, and displays, on the display unit 108, a screen 820 configured to notify the user of a handling method after power-OFF. As a result, the user B can cancel the ink holder error of the printing apparatus 151 in accordance with the guidance of the handling method after power-OFF, which is displayed on the screen 820.

As described above, according to this embodiment, even in a case where a plurality of users alternately execute printing from the printer driver and share the printing apparatus 151, a handling method necessary after power-OFF is displayed. As a result, the user B can complete the series of error cancel procedures until after power-OFF. Also, in this case as well, since the screen of offline notification is not displayed for the user B, it is possible to prevent the user B from being confused by the display of the screen of offline notification after performing an operation according to the procedure of the guidance.

Note that a form in which a first screen displayed in step S609 before the printing apparatus 151 is powered off and a second screen displayed in step S623 after the printing apparatus 151 is powered off are separately displayed as the guidance of the error cancel method including the power-OFF operation of the printing apparatus 151 has been described above. However, the present invention is not limited to this form. For example, the contents of the first screen and the second screen described above may be displayed at once before the printing apparatus 151 is powered off. In this case, in step S623, display on the screen configured to notify the user of the handling method is not changed, and only control not to execute the display of the screen of offline notification is executed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-202770, filed Dec. 14, 2021, which is hereby incorporated by reference herein in its entirety.

What is claimed is:

1. A method comprising:
    acquiring, from an external device comprising a printing unit, device information concerning the external device;
    if information corresponding to the external device being in a predetermined state in which processing using the printing unit is inexecutable is included in the acquired device information, displaying, on a display unit of an information processing apparatus, a screen for cancelling the predetermined state; and
    in a case where an operation of canceling the predetermined state includes an operation of powering off the external device, even if communication between the external device and the information processing apparatus becomes inexecutable after the screen for cancelling the predetermined state is displayed, not executing a notification indicating a state in which the communication between the external device and the information processing apparatus is inexecutable, and in a case where the operation of canceling the predetermined state does not include the operation of powering off the external device, executing, based on a fact that the communication between the external device and the information processing apparatus becomes inexecutable after the screen for cancelling the predetermined state is displayed, the notification indicating the state in which the communication between the external device and the information processing apparatus is inexecutable.

2. The method according to claim 1, wherein
    in the case where the operation of canceling the predetermined state includes the operation of powering off the external device, a first screen for urging a user to do the operation of powering off the external device is displayed on the display unit as the screen for cancelling the predetermined state.

3. The method according to claim 2, wherein
    based on power-OFF of the external device after the display of the first screen, a second screen for urging the user to do an operation after powering off the external device is displayed on the display unit.

4. The method according to claim 3, wherein
the device information is acquired from the external device after the display of the first screen and before the display of the second screen, and
a third screen different from the first screen and the second screen is displayed on the display unit based on the device information.

5. The method according to claim 4, wherein
the device information acquired before the display of the first screen includes information representing a power ON state, and
the device information acquired after the display of the first screen includes information representing that the external device is shifting to a power OFF state.

6. The method according to claim 4, wherein
the third screen is a screen that shows that the external device is shifting to a power OFF state.

7. The method according to claim 4, further comprising storing the acquired device information in a storage unit,
wherein the acquired device information is stored in the storage unit after the display of the third screen.

8. The method according to claim 1, wherein
in the case where the operation of canceling the predetermined state includes the operation of powering off the external device, the notification is not executed even if the acquisition of the device information fails.

9. The method according to claim 1, wherein
in the case where the operation of canceling the predetermined state does not include the operation of powering off the external device, the notification is executed based on the acquisition of the device information failing and the operation of canceling the predetermined state does not include the operation of powering off the external device.

10. The method according to claim 1, wherein
in the case where the operation of canceling the predetermined state does not include the operation of powering off the external device, the notification is executed based on the acquisition of the device information failing and the acquired device information including information representing that the external device is in a power ON state.

11. The method according to claim 1, further comprising determining whether the operation of canceling the predetermined state includes the operation of powering off the external device.

12. The method according to claim 11, wherein
the device information includes information concerning whether the operation of canceling the predetermined state includes the operation of powering off the external device, and
the determination is performed based on the device information.

13. The method according to claim 1, wherein
the printing unit includes at least one of an ink holder and a print head.

14. The method according to claim 1, wherein
the acquisition of the device information, the display of the screen associated with the error, and the notification are executed by a printer driver.

15. The method according to claim 1, wherein
the acquisition of the device information, the display of the screen associated with the error, and the notification are executed by a setup application program of the external device.

16. The method according to claim 1, wherein
the predetermined state canceled by the operation including the operation of powering off the external device is at least one of a state in which a paper jam occurs and a state in which an ink holder of the external device is not able to be undriven in the external device.

17. The method according to claim 1, wherein
the predetermined state canceled by the operation that does not include the operation of powering off the external device is at least one of a state in which a paper jam occurs, a state in which a packing material is unremoved, a state in which a cover is open, a state in which an ink holder is not attached to the external device, and a state in which a paper is not set in the external device.

18. The method according to claim 1, wherein
the screen for cancelling the predetermined state is at least one of a screen indicating an operation for cancelling the predetermined state, a screen indicating the predetermined state occurs, and a screen displaying a button for causing a web browser to display a screen indicating an operation for cancelling the predetermined state.

19. An information processing apparatus capable of communicating with an external device comprising a printing unit, comprising:
a memory containing instructions and a processor for executing the instructions to:
acquire, from the external device, device information concerning the external device;
if information corresponding to the external device being in a predetermined state in which processing using the printing unit is inexecutable is included in the acquired device information, display, on a display unit of the information processing apparatus, a screen for cancelling the predetermined state; and
in a case where an operation of canceling the predetermined state includes an operation of powering off the external device, even if communication between the external device and the information processing apparatus becomes inexecutable after the screen for cancelling the predetermined state is displayed, not executing a notification indicating a state in which the communication between the external device and the information processing apparatus is inexecutable, and in a case where the operation of canceling the predetermined state does not include the operation of powering off the external device, executing, based on the communication between the device and the information processing apparatus becoming inexecutable after the screen for cancelling the predetermined state is displayed, the notification indicating the state in which the communication between the external device and the information processing apparatus is inexecutable.

20. A non-transitory computer-readable storage medium storing a program configured to cause a computer to function to:
acquire, from an external device comprising a printing unit, device information concerning the external device;
if information corresponding to the external device being in a predetermined state in which processing using the printing unit is inexecutable is included in the acquired device information, display, on a display unit of the information processing apparatus, a screen for cancelling the predetermined state; and
in a case where an operation of canceling the predetermined state includes an operation of powering off the external device, even if communication between the device and the information processing apparatus becomes inexecutable after the screen for cancelling the predetermined state is displayed, not execute a notification indicating a state in which the communication between the external device and the information processing apparatus is inexecutable, and in a case where the operation of canceling the predetermined state does not include the operation of powering off the external device, execute, based on the communication between the device and the information processing apparatus becoming inexecutable after the screen for cancelling the predetermined state is displayed, the notification indicating the state in which the communication between the external device and the information processing apparatus is inexecutable.

* * * * *